United States Patent
Yanagi (10) Patent No.: US 7,412,214 B2
(45) Date of Patent: Aug. 12, 2008

(54) RADIO INPUT DEVICE

(75) Inventor: Masahiro Yanagi, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 332 days.

(21) Appl. No.: 10/909,327

(22) Filed: Aug. 3, 2004

(65) Prior Publication Data

US 2005/0143021 A1    Jun. 30, 2005

(30) Foreign Application Priority Data

Dec. 25, 2003    (JP) .............................. 2003-430630

(51) Int. Cl.
*H04B 1/034* (2006.01)
*G06F 3/033* (2006.01)

(52) U.S. Cl. ...................... 455/117; 455/90.3; 455/90.2; 455/128; 345/163

(58) Field of Classification Search ................ 455/90.3, 455/90.2, 128, 575.5, 117; 345/163–166; 361/600, 800, 814, 816, 818
See application file for complete search history.

(56) References Cited

U.S. PATENT DOCUMENTS

| 5,517,676 | A * | 5/1996 | Sekine et al. ............. 455/575.5 |
| 5,867,370 | A * | 2/1999 | Masuda ....................... 361/800 |
| 6,249,256 | B1 * | 6/2001 | Luxon et al. ................. 343/702 |
| 6,996,425 | B2 * | 2/2006 | Watanabe ................. 455/575.1 |
| 2002/0183098 | A1 * | 12/2002 | Lee et al. ..................... 455/566 |
| 2005/0113037 | A1 * | 5/2005 | Ponce De Leon et al. .. 455/90.3 |

FOREIGN PATENT DOCUMENTS

| JP | 11212719 A | * | 8/1999 |
| JP | 2002-196844 | | 7/2002 |
| KR | 2002063467 A | * | 8/2002 |

* cited by examiner

*Primary Examiner*—Philip J Sobutka
(74) *Attorney, Agent, or Firm*—Staas & Halsey LLP (57) ABSTRACT

A radio input device includes a holding part to be held by an operator; an operation part to be operated by the operator; a transmission part transmitting radio waves from an antenna according to the operation of the operation part; and a blocking part avoiding influence of a surrounding electric conductor on the radio waves.

19 Claims, 10 Drawing Sheets

λ/4 GROUND ANTENNA

RADIO INPUT DEVICE

BACKGROUND OF THE INVENTION

1. Field of the Invention

The present invention relates to a radio input device, and, in particular, to a radio input device having a holding part to be held by an operator, an operation part to be operated by the operator, and a transmission part transmitting radio waves from an antenna according to the operator's operation on the operation part.

2. Description of the Related Art

For a computer system, a recent trend is to configure a peripheral device such as a mouse, a keyboard, or such, in such a manner that it may be operated in a wireless manner, for the purpose of simplification of electric connection for such a periodical device or improvement in operation convenience of the same. Radio waves, infrared waves or such may be applied for achieving such a configuration to enable wireless operation.

Thereamong, a method of applying radio waves has an advantage of signal penetrability, an advantage of not being likely to be affected by an obstruction or such thanks to diffraction or reflection of radio waves, and also, advantage of flexibility of location of mounting a relevant facility.

A wireless mouse in a radio wave type has a radio transmission unit built therein, and, transmits coordinate information input by means of a coordinate input part, by means of radio waves from the radio transmission unit (see Japanese Laid-open Patent Application No. 2002-196844).

SUMMARY OF THE INVENTION

However, such a radio input device in the prior art may not be configured in consideration of influence of an operator on radio waves transmitted. Therefore, a radio wave transmission condition may change according to the operator's operation situation, and, as a result, proper operation thereof may not be positively achieved in some cases.

The present invention has been devised in order to solve such a problem, and, an object of the present invention is to provide a radio input device which can maintain a good condition of radio wave transmission.

According to the present invention, a radio input device includes a holding part to be held by an operator; an operation part to be operated by the operator; a transmission part transmitting radio waves from an antenna according to the operation of the operation part; and a blocking part avoiding influence of a surrounding electric conductor on the radio waves.

The blocking part may be provided between the antenna and the surrounding electric conductor, and may be made of electric conductive material insulated from the surrounding electric conductor.

The electric conductive material may be grounded, and may act as a ground plane for the antenna.

The blocking part may be made of a wave absorber provided between the antenna and the surrounding conductive material.

An upper case, and a lower case covering a device body in combination with the upper case may be further provided, and the blocking part may be provided on the upper case.

The blocking part may be provided further on the lower case.

The blocking part may be made of electric conductive material plated on an inner surface of the upper case.

The blocking part may be made of electric conductive material plated also on an inner surface of the lower case.

The blocking part may be made from wave absorber contained in resin from which the upper case is made.

The blocking part may be made from wave absorber contained in resin from which the lower case is made.

Provision of the blocking part may be excluded from a direction in which the radio waves are transmitted.

According to the present invention having a configuration as mentioned above, it is possible to reduce leak of radio waves transmitted in a direction of a human being or of an operation table, and thus, it is possible to prevent the radio waves transmitted, from being transmitted again after passing through the human being or the operation table due to the leak of the radio waves thereto. Accordingly, it is possible to reduce generation of multi-path phenomena, and thereby to achieve stable communication.

BRIEF DESCRIPTION OF THE DRAWINGS

Other objects and further features of the present invention will become more apparent from the following detailed description when read in conjunction with the accompanying drawings.

DETAILED DESCRIPTION OF THE PREFERRED EMBODIMENTS

A system employing a wireless mouse as a radio input device according to an embodiment of the present invention will now be described.

Figure 1:
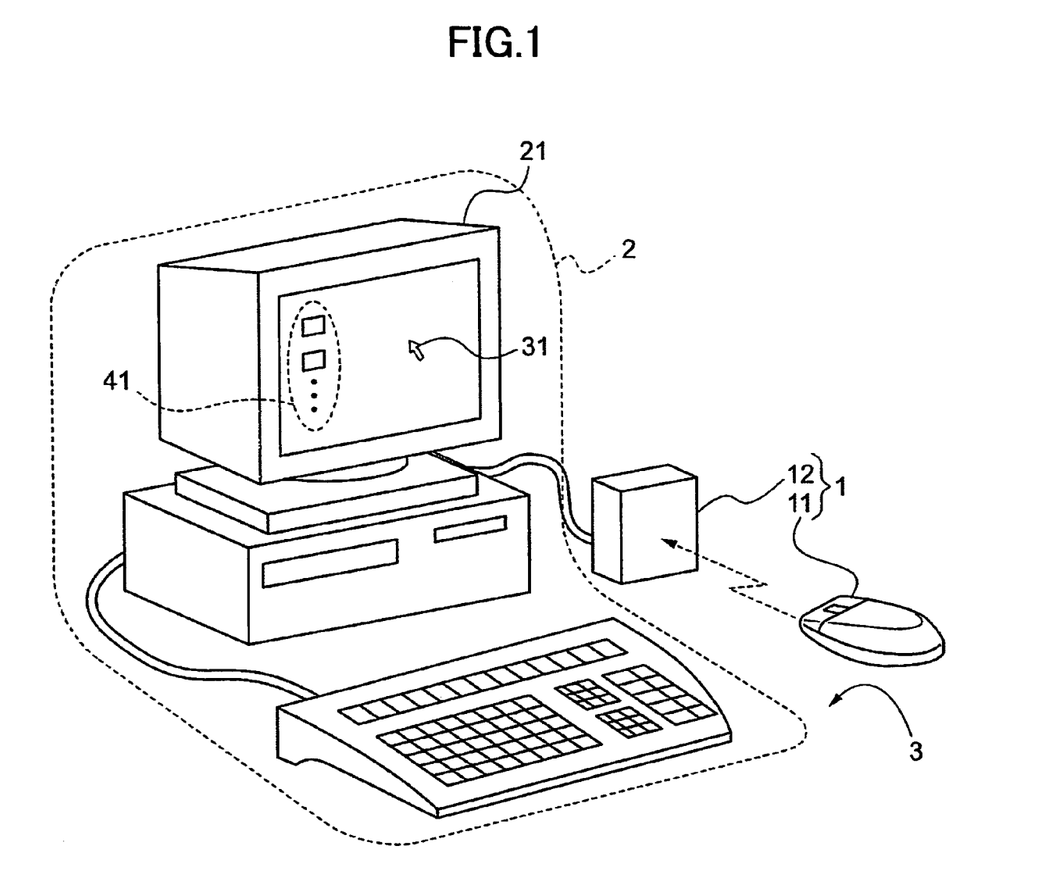
FIG. 1 shows a system configuration of an embodiment of the present invention.

FIG. 1 shows a system configuration of the system according to the embodiment of the present invention.

The wireless mouse system 1 in the embodiment of the present invention is used, for example, as a pointing device for a computer system 2. The wireless mouse system 1 includes a wireless mouse 11 and a receiving device 12. The wireless mouse 11 generates an input signal according to operation performed thereon by an operator, and transmits the thus-generated input signal in a form of radio waves. The receiving device 12 is connected with the computer system 2 via an interface such as an USB (universal serial bus), a PS/2® (IBM Personal System/2), or such, receives the radio waves thus transmitted from the wireless mouse 11, demodulates the input signal, and transmits the thus-obtained signal to the compute system 2. The computer system 2 executes predetermined processing operation with the use of a pointer 31 displayed on a display device 21 according to the input signal thus transmitted from the receiving device 12. For example, movement of the pointer 31, selection of an icon 41 by means of the pointer 31, execution of a command corresponding to the icon 41 thus selected, or such is performed.

The wireless mouse 11 is described next in detail.

Figure 2:
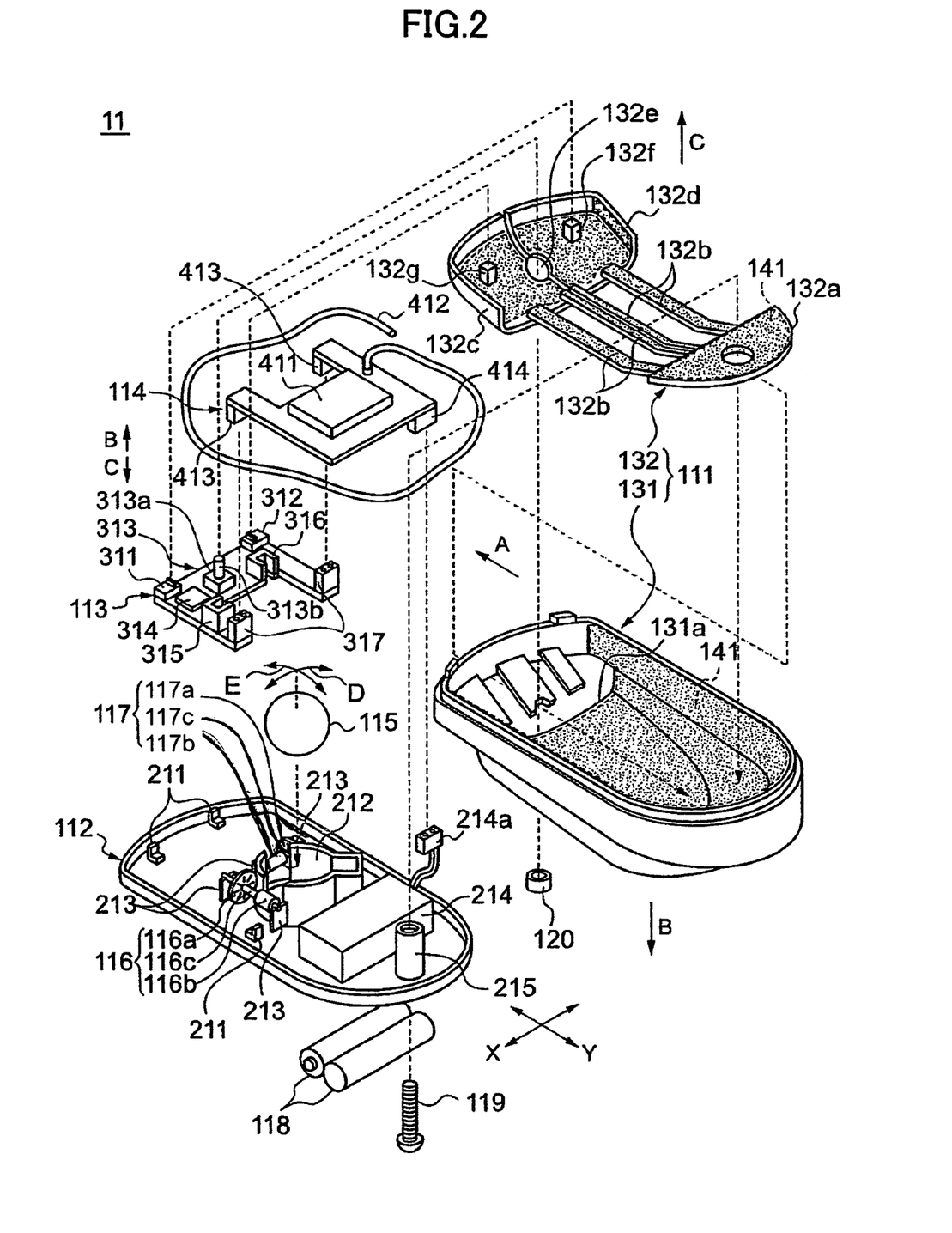
FIG. 2 shows an exploded perspective view of a wireless mouse according to an embodiment of the present invention.
Figure 3:
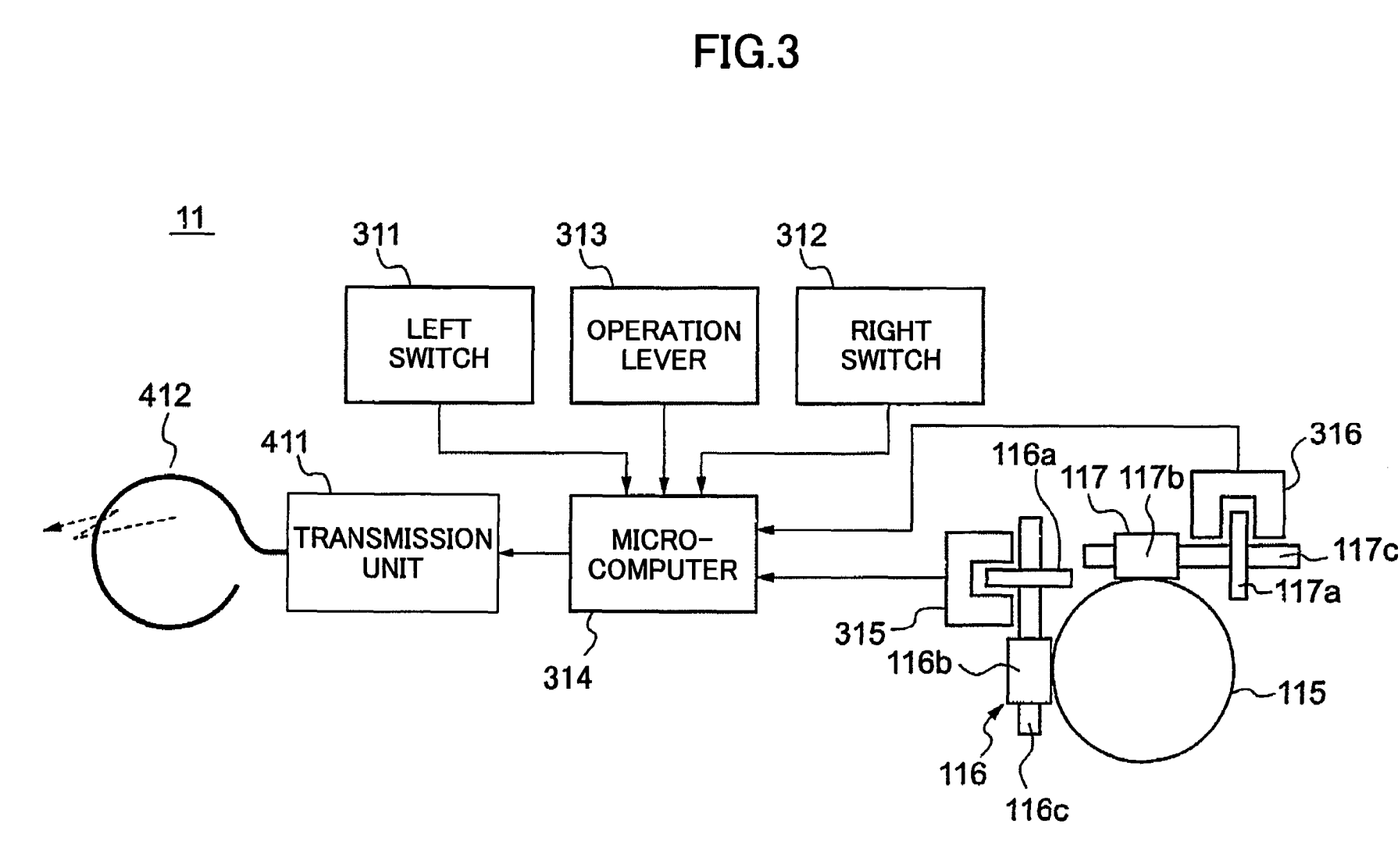
FIG. 3 shows a block configuration of the wireless mouse shown in FIG. 2.
Figure 4:
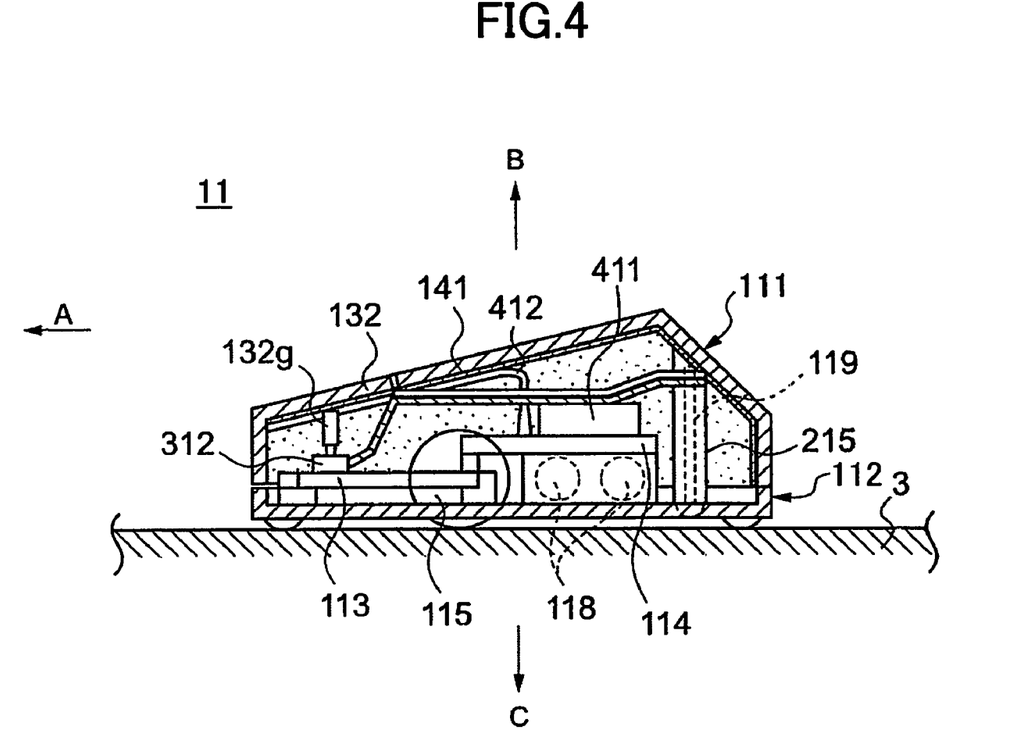
FIG. 4 shows a side-elevational sectional view of the wireless mouse shown in FIG. 2.

FIG. 2 shows an exploded perspective view of the wireless mouse 11, FIG. 3 show a block configuration of the wireless mouse 11, and FIG. 4 shows a side-elevational sectional view of the wireless mouse 11.

As shown, the wireless mouse 11 includes an upper case 111, a lower case 112, circuit substrates 113, 114, a ball 115, rollers 116, 117, a battery 118, a screw 119 and a cap 120.

The upper case 111, acting as a holding part, includes an upper case body 131 and an operation button 132. The operation button 132 acts as an operation part. The upper case body 131 and the operation button 132 are molded from resin material.

The upper case 111 has an opening 131a in forward direction A. The operation button 132 is mounted in the upper case body 131 through the opening 131a.

The operation button 132 has a configuration in which a fixing part 132a, spring parts 132b and operation button parts 132c and 132d are integrally molded. The operation button 132 is engaged with and held inside of the upper case body 131 after the fixing part 132a is inserted from a top side of the upper case body 131, i.e., from a direction B through the opening 131a. The operation button parts 132c and 132d are connected together by means of the spring parts 132b.

An electric conductor film 141, acting as a blocking part, is formed on approximately the entire inner surfaces of the upper case body 131 and the operation button 132 as indicated by fine dots drawn, except a front surface in a direction of an arrow A as shown.

The electric conductor film 141 is made of electric conductor such as copper, and formed on approximately the entire inner surfaces of the upper case body 131 and the operation button 132 except the front surface in the direction of the arrow A as mentioned above, in a metal plating method or such. The electric conductor film 141 is formed in such a manner that an operator may not touch it when the operator operates the operation button 132. This electric conductor film 141 is disposed between the inner circuit of the wireless mouse 11 and the operator, and thus, functions to reduce influence of the human body on radio waves transmitted therefrom by blocking radio waves passing therethrough.

The lower case 112 is molded from resin material, and, configures, in combination with the upper case 111, a housing to house the circuit substrates 113, 114, the ball 115, the rollers 116, 117, and the battery 118.

The lower case 112 has engagement parts 211, a ball container 212, roller holders 213, a battery holder 214, and a boss 215 as shown in FIG. 2.

The circuit substrate 113 is engaged with the engagement part 211. In the ball container 212, the ball 115 is rotatable contained. With the roller holders 213, the roller 116 is rollably held.

The roller 116 includes a light blocking plate 116a, a roller part 116b and a rotation shaft 116c. The light blocking plate 116a and the roller part 116b are fixed to the rotation shaft 116c.

Slits are formed cyclically each extending along a radial direction with respect to the rotation shaft 116c as a center of the radial direction in the light blocking plate 116a, and the light blocking plate 116a is rotated according to rotation of the roller part 116b. The roller part 116b projects in an inner direction of the ball container 212, and is in contact with the ball 115 contained in the ball container 212. The roller part 116b is rolled according to rotation of the ball 115 in a direction D. As a result of the roller part 116b being thus rolled, the light blocking plate 116a rotates accordingly. By detecting the rotation of the light blocking plate 116a, movement of the wireless mouse 11 in a direction of an arrow X is detectable.

Similarly, the roller 117 includes a light blocking plate 117a, a roller part 117b and a rotation shaft 117c. The light blocking plate 117a and the roller part 117b are fixed to the rotation shaft 117c.

Slits are formed cyclically each extending along a radial direction with respect to the rotation shaft 117c as a center of the radial direction in the light blocking plate 117a, and the light blocking plate 117a is rotated according to rotation of the roller part 117b. The roller part 117b projects in an inner direction of the ball container 212, and is in contact with the ball 115 contained in the ball container 212. The roller part 117b is rolled according to rotation of the ball 115 in a direction E. As a result of the roller part 117b being thus rolled, the light blocking plate 117a rotates accordingly. By detecting the rotation of the light blocking plate 117a, movement of the wireless mouse 11 in a direction of an arrow Y is detectable.

The battery holder 214 has batteries 118 inserted thereto from a bottom side or from a direction of an arrow C of the lower case 112 (see FIG. 4). A connector 214a extending from the battery holder 214 provides electric power to the circuit substrates 113 and 114. The circuit substrate 114 is held by the battery holder 214 on a top surface thereof or mounted thereto from a direction of an arrow B.

The boss 215 holds the operation button 132 and projects to the inner surface of the upper case 111. The screw 119 is inserted into the boss 215 from a bottom side of the lower case 112 or from the direction of the arrow C. The screw 119 is screwed into a screw hole formed in the inner surface of the upper case body 131, and thus, the upper case 111 is locked to the lower case 112.

On the circuit substrate 113, switches 311, 312, an operation lever 313, a microcomputer 314, photoelectric switches 315, 316 and connectors 317 are mounted.

The switch 311 is engaged with a projection 132f extends from the inner surface of the operation button part 132d. When the operation button part 132d is moved in the direction of the arrow C, the projection part 132f is caused to press the switch 311 which is then turned on. Thus, left button operation is performed.

Similarly, the switch 312 is engaged with a projection 132g extends from the inner surface of the operation button part 132c. When the operation button part 132c is moved in the direction of the arrow C, the projection part 132g is caused to press the switch 312 which is then turned on. Thus, right button operation is performed.

The operation lever 313 is used as an operation part for an operator to perform scrolling operation, and includes an operation lever body 313a and a lever 313b. The operation lever body 313a is soldered onto a front center of the circuit substrate 113. The lever 313a extends from a through hole 132e provided in the operation button 132, and has a cap 120 loaded thereon. When the cap 120 is operated by the operator, the lever 313a moves, and thereby, operation such as scrolling is performed.

The photoelectric switch 315 is turned on/off according to rotation of the light blocking plate 116a provided on the roller 116. Thereby, the photoelectric switch 316 is turned on/off according to rotation of the ball 115 in the direction of the arrow D. It is noted that the light blocking plate 116a is inserted into a slit formed in the photoelectric switch 315 so that the photoelectric switch 315 may detect rotation of the light blocking plate 116a by detecting light passing through the slits of the light blocking plate 116a.

Similarly, the photoelectric switch 316 is turned on/off according to rotation of the light blocking plate 117a provided on the roller 117. Thereby, the photoelectric switch 316 is turned on/off according to rotation of the ball 115 in the direction of the arrow E. It is noted that the light blocking plate 117a is inserted into a slit formed in the photoelectric switch 316 so that the photoelectric switch 316 may detect rotation of the light blocking plate 117a by detecting light passing through the slits of the light blocking plate 117a.

Signals are provided to the microcomputer 314 from the switches 311, 312, the operation lever 313 and the photoelectric switches 315, 316. Based on the signals provided from the switches 311, 312, the operation lever 313 and the photoelectric switches 315, 316, the microcomputer generates the input signal according to the operation performed by the operator on the wireless mouse 11.

The connectors 317 of the circuit substrate 113 are connected to connectors 413 mounted on the circuit substrate 114. The input signal thus generated by the microcomputer 314 is provided to the circuit substrate 114 through the connectors 317 and 413.

On the circuit substrate 114, a transmission unit 411, an antenna 412 and the connectors 413, 414 are mounted.

The connectors 413 are connected to the connectors 317 of the circuit substrate 113, respectively, as mentioned above and thus, the circuit substrate 114 is connected with the circuit substrate 113. Further, the connecter 414 is connected with the connector 214a drawn from the battery holder 214, and thus, electric power is supplied to the circuit substrate 114 from the battery 118 held by the battery holder 214. Electric power supplied from the battery 118 is used to drive the transmission unit 411 mounted on the circuit substrate 114, and also, is supplied to the circuit substrate 113. The circuit substrate is driven by the electric power provided by the battery 118, and provides the generated input signal to the transmission unit 411 mounted on the circuit substrate 114.

The transmission unit 411, acting as a transmission part, is driven by the electric power supplied by the battery 118, modulates the input signal generated by the circuit substrate 113 and transmits the thus-obtained signal in a form of radio waves from the antenna 412. The antenna 412 is made of an electric conductive wire, and, assuming that a carrier wave of the radio waves transmitted has a wavelength λ, the antenna 412 is set to have a length of ¼λ. The wire of the antenna 412 is laid on the top side or the side in the direction of the arrow B of the inner surface of the upper case 131.

The antenna 412 is thus disposed on the inner surface of the upper case 111, and also the electric conductor film 141 is formed on the inner surface of the upper case 111. Therefore, in a state in which an operator holds the wireless mouse 11 by his or her hand, the electric conductor film 141 is inserted between the antenna 412 and the operator's hand, with the operator's hand acting as an electric conductor. Thereby, influence of the operator's hand on the radio waves transmitted from the antenna 412 can be effectively reduced. As a result, it becomes possible to transmit the radio waves from the antenna 412 stably. The radio waves transmitted from the antenna 412 are mainly transmitted therefrom through a front part of the wireless mouse 11 or in the direction of the arrow A at which the electric conductor film 141 is not provided as mentioned above.

Thereby, it is possible that the radio waves have directivity in a certain degree, and thereby, it is possible to perform further stable radio transmission.

Thus, according to the embodiment of the present invention described above, since the electric conductor film 141 is formed on the inner surface of the upper case 111 except a front part or a part in the direction of the arrow A, it is possible to effectively reduce influence of a hand of an operator which is placed on the top surface of the upper case 111 on the radio waves transmitted. Thereby, it is possible to achieve stable radio transmission. Further, by omitting provision of the electric conductor film 141 on the front part of the upper case 111, it is possible that the radio waves transmitted have directivity, and thereby, it is possible to achieve further stable radio transmission.

A first variant embodiment of the above-described embodiment of the present invention is described next with reference to FIGS. 5 and 6.

Figure 5:
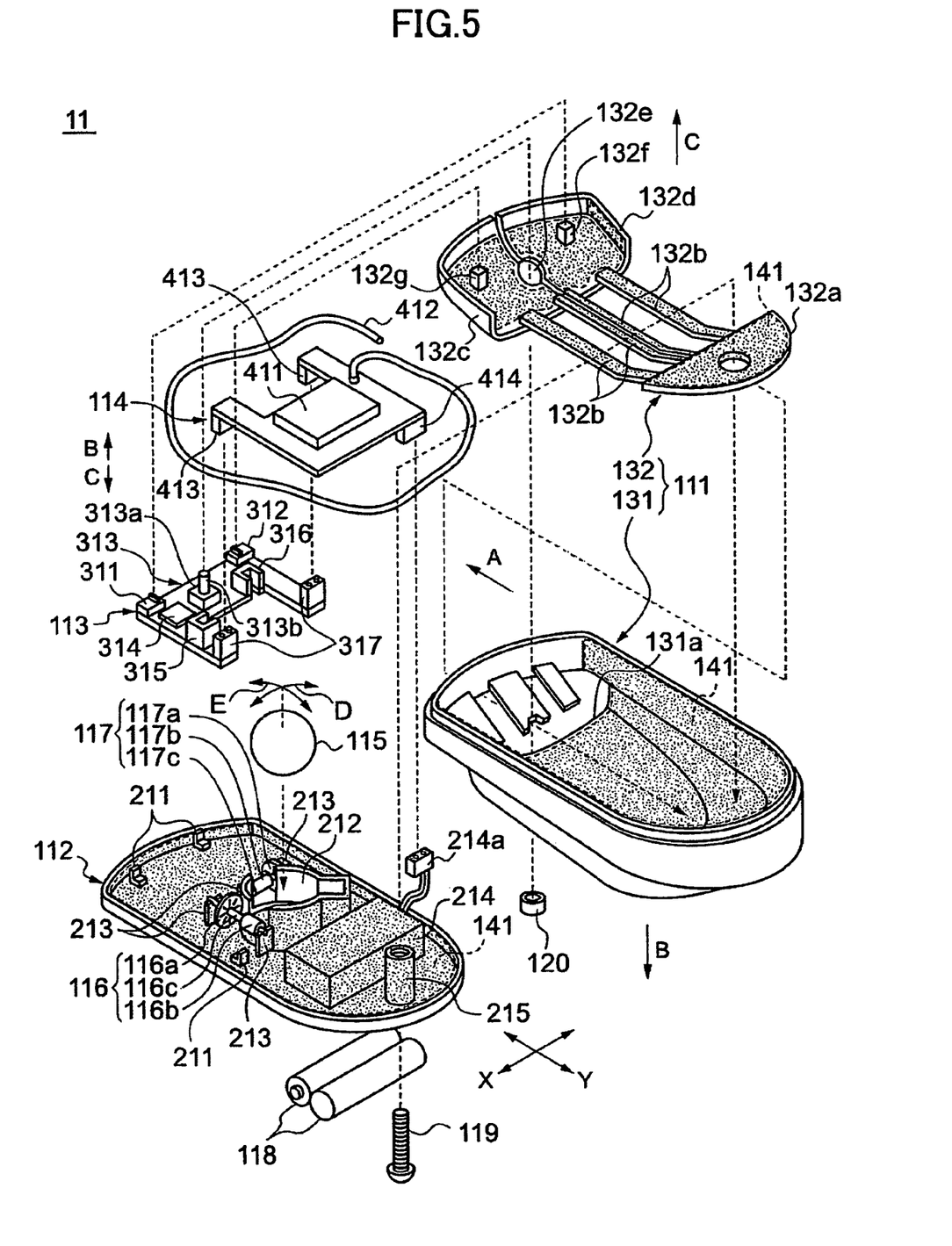
FIG. 5 shows an exploded perspective view of a wireless mouse in a first variant embodiment of the present invention.
Figure 6:
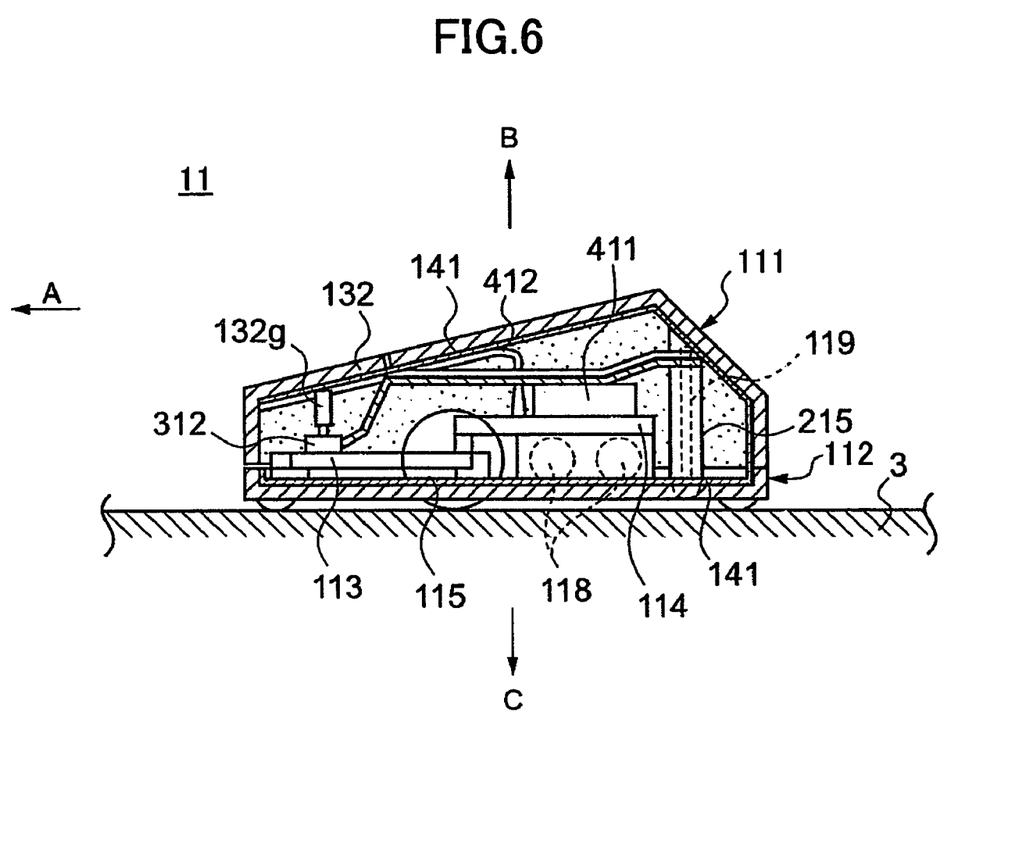
FIG. 6 shows a side-elevational sectional view of the wireless mouse shown in FIG. 5.

FIG. 5 shows an exploded perspective view of a wireless mouse 11 in the first variant embodiment, and FIG. 6 shows a side elevational sectional view of the same wireless mouse 11. In these figures, the same reference numerals are given to components/parts identical to those shown in FIGS. 1 through 4 described above, and duplicated description therefor will be omitted.

In the wireless mouse 11 in the first variant embodiment, in addition to the inner surface of the upper case 111, an electric conductor film 141 is also formed on an inner surface of the lower case 112 as shown in FIG. 5 in which the provision of the electric conductor films 141 is indicated by fine dots drawn in the same manner as that in FIG. 2. By forming the electric conductor film 141 also on the inner surface of the lower case 12, it is possible to reduce influence of an operation surface 3 (or an operation table, see FIG. 6) on radio waves transmitted.

In a case where the operation surface 3 on which the wireless mouse 11 is operated is made from metal or such, radio waves transmitted from the wireless mouse 11 are propagated by the operation surface 3, are received by the receiving unit 12 after that, thus, multi-path phenomenon occurs with direct waves directly received from the wireless mouse 11 and indirect waves indirectly thus received via the operation surface 3. In such a case, since these waves interfere in each other, and thereby, it may not be possible to properly receive the radio waves in the receiving device 12.

According to the first variant embodiment, the electric conductor film 141 formed in the lower case 112 effectively reduces influence of radio waves otherwise propagated by the operation surface 3, since radio waves transmitted from the antenna 412 in a direction of the operation surface 3 are blocked by the electric conductor film 141 formed on the lower case 112.

Figure 7:
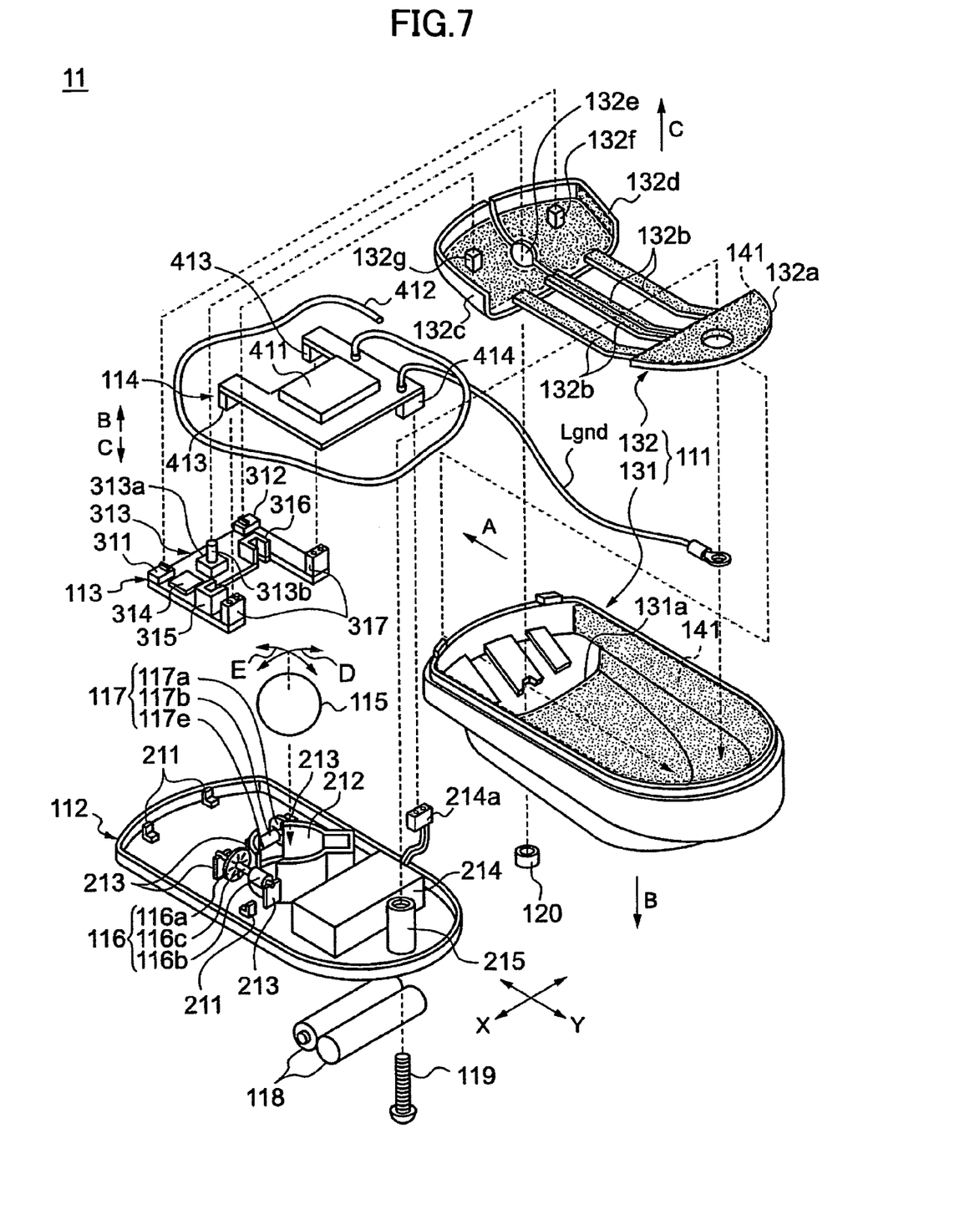
FIG. 7 shows an exploded perspective view of a wireless mouse in a second variant embodiment of the present invention.
Figure 8:
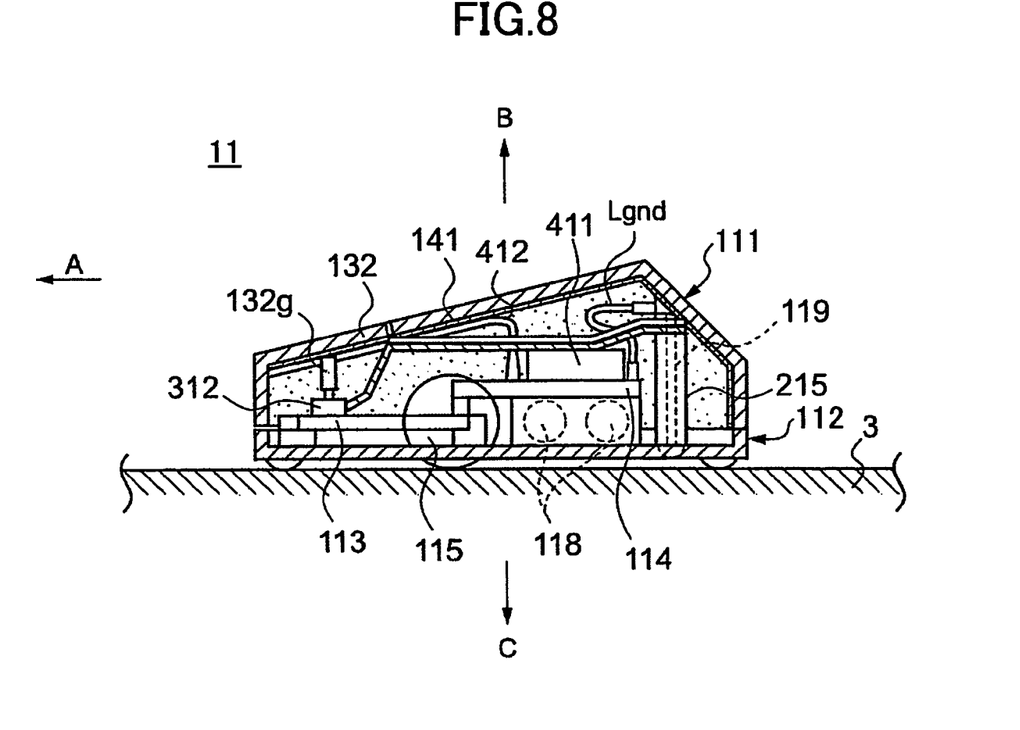
FIG. 8 shows a side-elevational sectional view of the wireless mouse shown in FIG. 7.

With reference to FIGS. 7 and 8, a second variant embodiment of the above-mentioned embodiment of the present invention is described next.

FIG. 7 shows an exploded perspective view of a wireless mouse 11 in the second variant embodiment, and FIG. 8 shows a side elevational sectional view of the same wireless mouse 11. Also in these figures, the same reference numerals are given to components/parts identical to those shown in FIGS. 1 through 4 described above, and duplicated description therefor will be omitted.

In the wireless mouse 11 according to the second variant embodiment, a ground line Lgnd is drawn from the circuit substrate 114, and is directly connected to the electric conductor film 141. The connection between the electric conductor film 141 and the ground line Lgnd is performed as a result of, for example, the extending end of the ground line Lgnd being sandwiched between the upper case body 131 and the operation button 132 when the operation button 132 is screwed onto the upper case body 131 by means of the screw 119.

Figure 9:
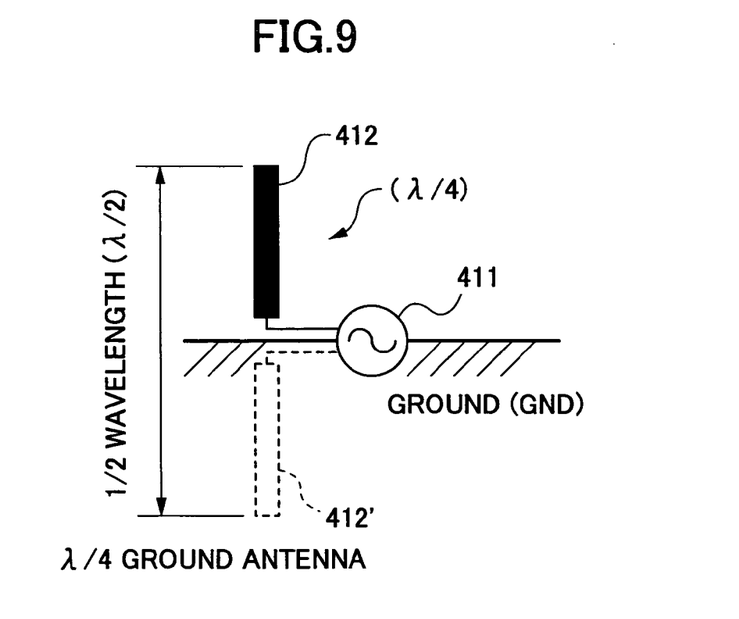
FIG. 9 illustrates operation of the wireless mouse in the second variant embodiment.

FIG. 9 illustrates operation in the wireless mouse 11 according to the second variant embodiment described above.

As a result of the electric conductor film 141 being thus grounded by means of the ground line Lgnd as mentioned above, as shown in FIG. 9, whereby the electric conductor film 141 acts as a ground plane for the antenna 412, a ground antenna 412' is virtually created having a length of λ/4, and therewith, the antenna 412 acts as an antenna having a total length of λ/2 (λ/4 +λ/4). According to the second variant embodiment, as a result of the antenna 412 of the length λ/4 being able to be used an antenna of the length λ/2 virtually, radio weaves waves can be efficiently transmitted therewith.

Figure 10:
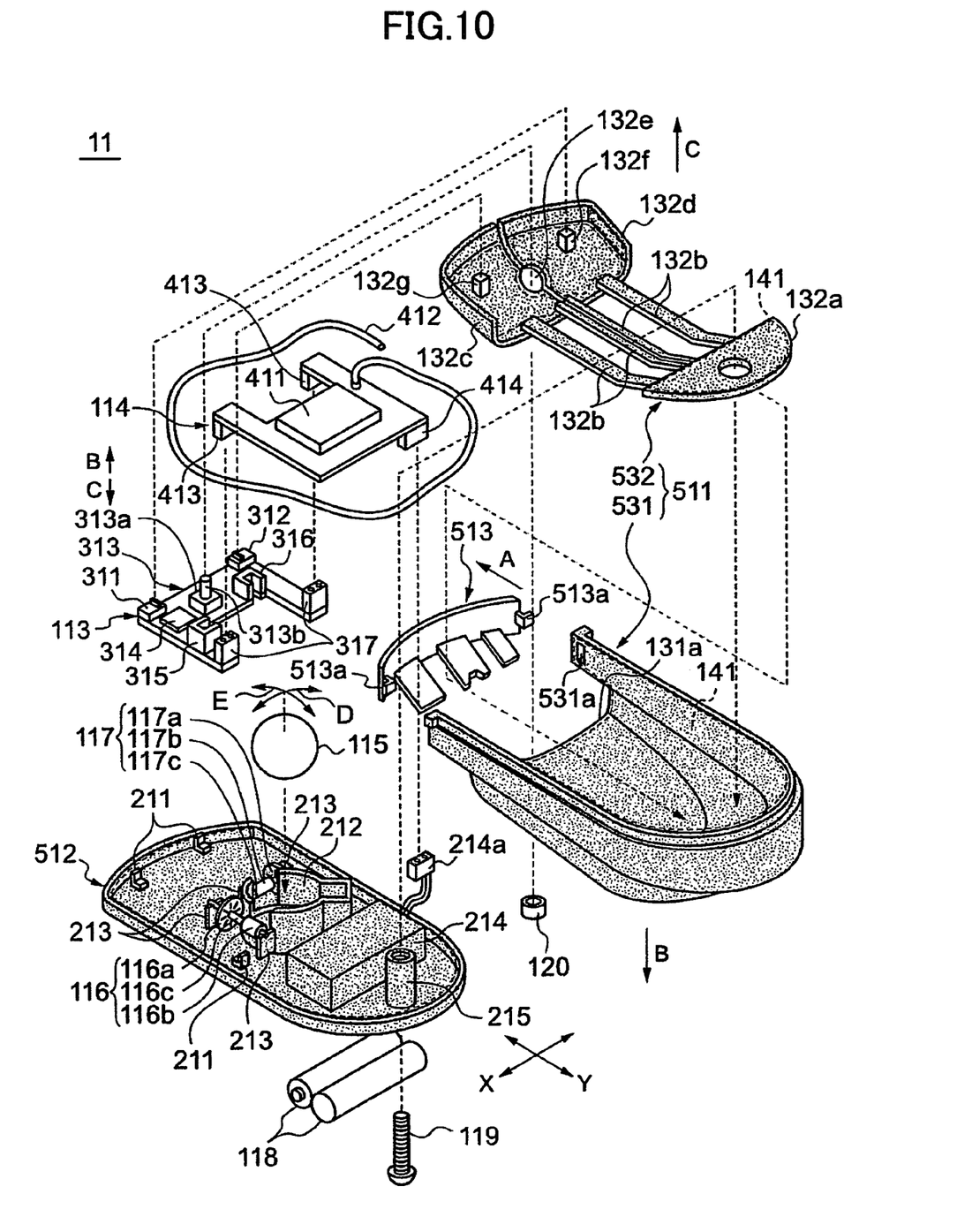
FIG. 10 shows an exploded perspective view of a wireless mouse in a third variant embodiment of the present invention.
Figure 11:
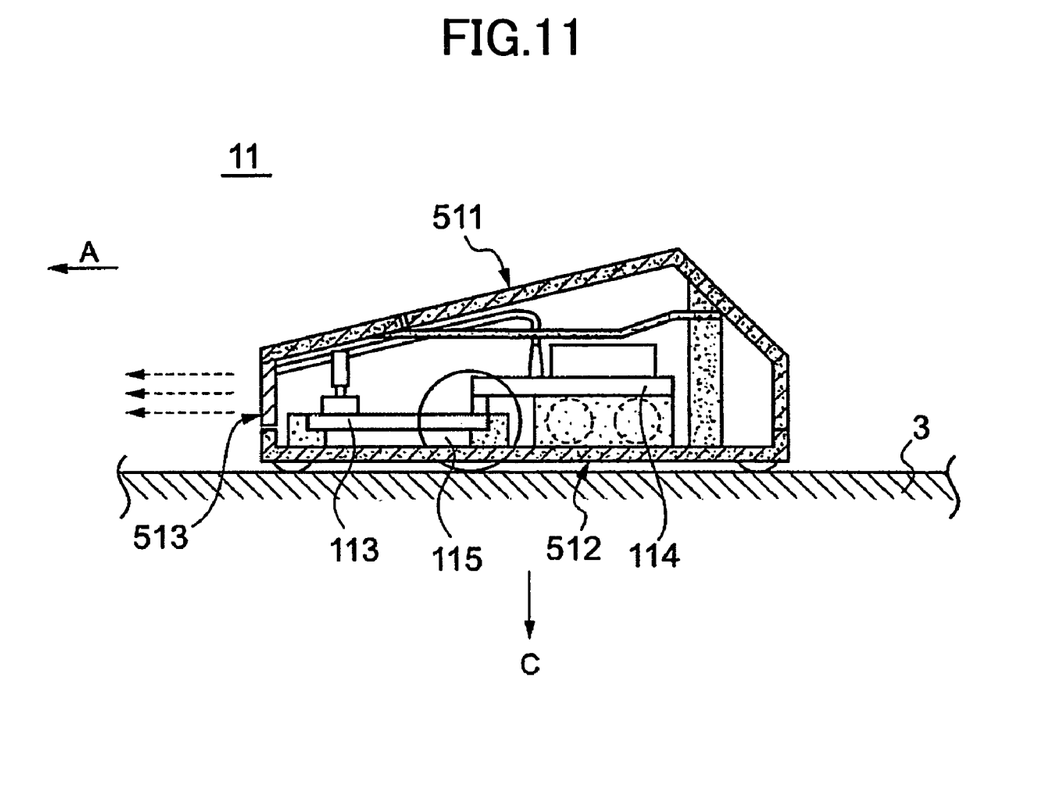
FIG. 11 shows a side-elevational sectional view of the wireless mouse shown in FIG. 10.

With reference to FIGS. 10 and 11, a third variant embodiment of the above-mentioned embodiment of the present invention is described next.

FIG. 10 shows an exploded perspective view of a wireless mouse 11 in the third variant embodiment, and FIG. 11 shows a side elevational sectional view of the same wireless mouse 11. Also in these figures, the same reference numerals are given to components/parts identical to those shown in FIGS. 1 through 4 described above, and duplicated description therefor will be omitted.

According to the third variant embodiment, as shown, the above-mentioned upper case 111 and the lower case 112 in the above-described embodiment are configured instead by an upper case 511, a lower case 512 and a front cover 513.

The upper case 512 includes an upper case body 531 and an operation button 532. The front cover 513 has nail parts 513a at positions at which the front cover 513 engages with the upper case body 531, and, as a result of the nail parts 513a being engaged with respective cavity portions 531a formed in the upper case body 531 at positions at which the upper case body 531 engages with the front cover 513, the front cover 513 is mounted at a front part of the wireless mouse 11.

The upper case 511 and the lower case 512 are configured to act as blocking members as a result of they being molded from resin material in which wave absorber is contained. The radio absorber contains, for example, carbon, for example, for the purpose of function of absorbing radio waves. The front cover 513 does not contain such wave absorber, and thus, is configured to transmit or penetrate radio waves.

According to the third variant embodiment, since radio waves transmitted from the transmission unit 114 in directions other than the direction of the arrow A are absorbed by the wave absorber contained in the upper case 511 and the lower case 512, and as a result, are not transmitted in directions in which an operator may exist nor in a direction of the operation surface 3.

Accordingly, according to the third variant embodiment, since the upper case 511 and the lower case 512 contain the wave absorber, radio waves transmitted in directions other than the direction of the arrow A are absorbed by the wave absorber, and thus, only radio waves transmitted in the direction of the arrow A can exit the wireless mouse 11. Thus, it is possible to avoid influence of the operator and the operation surface 3 on radio waves transmitted. Furthermore, it is possible that the radio waves may have directivity accordingly.

Further, the present invention is not limited to the above-described embodiments, and variations and modifications may be made without departing from the basic concept of the present invention claimed below.

The present application is based on Japanese Priority Application No. 2003-430630, filed on Dec. 25, 2003, the entire contents of which are hereby incorporated by reference.

What is claimed is:

1. A wireless mouse comprising:
   a holding part to be held by an operator;
   an operation part to be operated by the operator;
   a transmission part transmitting radio waves from an antenna according to the operation of the operation part; and
   a blocking part that is separate from the holding part and is provided as a thin conductive film on the inner surface of the holding part, the blocking part being configured to reduce the influence of an electric conductor, which directly contacts the holding part, on the radio waves.

2. The wireless mouse as claimed in claim 1, wherein:
   said electric conductive material is grounded, and acts as a ground plane for said antenna.

3. The wireless mouse as claimed in claim 1, wherein:
   said blocking part is made of wave absorber provided between the antenna and the surrounding conductive material.

4. The wireless mouse as claimed in claim 1, wherein:
   provision of said blocking part is excluded in a direction in which the radio waves are transmitted.

5. The wireless mouse as claimed in claim 1, further comprising:
   an upper case; and
   a lower case covering a device body in combination with said upper case wherein: said blocking part is provided on said upper case.

6. The wireless mouse as claimed in claim 5, wherein;
   said blocking part is provided also on said lower case.

7. The wireless mouse as claimed in claim 6, wherein:
   said blocking part comprises electric conductive material plated on an inner surface of said lower case.

8. The wireless mouse as claimed in claim 6, wherein:
   said blocking part comprises wave absorber contained in resin from which said lower case is made.

9. The wireless mouse as claimed in claim 6, further comprising:
   a lower front portion of said lower case,
   wherein provision of said blocking part is excluded from said lower front portion.

10. The wireless mouse as claimed in claim 5, wherein:
    said blocking part comprises electric conductive material plated on an inner surface of said upper case.

11. The wireless mouse as claimed in claim 10, wherein:
    provision of said blocking part is excluded in a direction in which the radio waves are transmitted.

12. The wireless mouse as claimed in claim 10, wherein:
    said electric conductive material is copper.

13. The wireless mouse as claimed in claim 5, wherein:
    said blocking part comprises wave absorber contained in resin from which said upper case is made.

14. The wireless mouse as claimed in claim 13, wherein:
    provision of said blocking part is excluded in a direction in which the radio waves are transmitted.

15. The wireless mouse as claimed in claim 5, wherein:
    provision of said blocking part is excluded in a direction in which the radio waves are transmitted.

16. The wireless mouse as claimed in claim 5, further comprising:
    an upper front portion of said upper case,
    wherein provision of said blocking part is excluded from said upper front portion.

17. A wireless mouse, comprising:
an antenna producing a mouse signal; and
a resin structure mouse housing surrounding said antenna, the housing having a thin conductive film formed along an inner surface thereof at a portion of the housing where a hand of a user contacts the wireless mouse.

18. A wireless mouse, comprising:
a housing having shielding formed along an inner surface of the housing at a portion of the housing where a hand of a user contacts the wireless mouse, and the shielding having an opening at a portion of the housing where a hand of a user does not contact the wireless mouse; and
an antenna inside the housing producing radio waves that are transmitted through the opening in the shielding.

19. A wireless mouse, comprising:
a transmitter transmitting radio waves from an antenna, the antenna being surrounded by a holding part; and
a blocking part on provided along an inner surface of the holding portion a portion of the mouse where a hand of a user contacts the mouse, the blocking part being configured to reduce the generation of multi-path phenomena.

* * * * *